Sept. 18, 1923.
B. R. SEABROOK
1,468,519
LAMINATED HORN AND PROCESS OF MAKING SAME
Filed Oct. 24, 1921
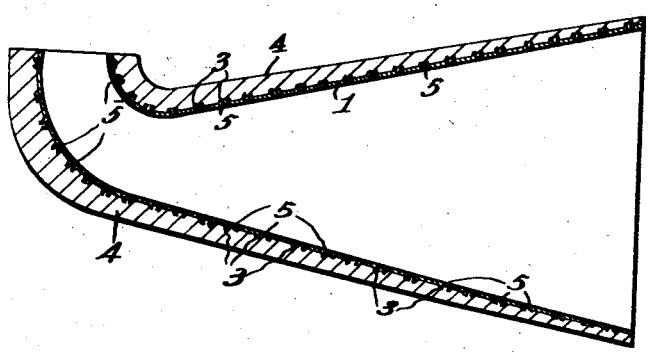
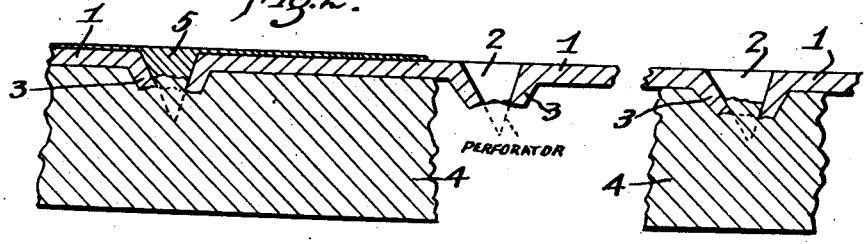
Bagster Roads Seabrook Inventor
By H. S. Amstutz
Attorney Patented Sept. 18, 1923.

1,468,519

UNITED STATES PATENT OFFICE.

BAGSTER ROADS SEABROOK, OF MISHAWAKA, INDIANA, ASSIGNOR, BY MESNE ASSIGNMENTS, TO LYRADIONI MANUFACTURING COMPANY, OF MISHAWAKA, INDIANA, A CORPORATION OF DELAWARE.

LAMINATED HORN AND PROCESS OF MAKING SAME.

Application filed October 24, 1921. Serial No. 510,004.

*To all whom it may concern:*

Be it known that I, BAGSTER ROADS SEABROOK, a subject of the Dominion of Canada, residing at Mishawaka, in the county of St. Joseph and State of Indiana, have invented certain new and useful Improvements in Laminated Horns and Processes of Making Same, of which the following is a specification.

My invention relates to improvements in composition support for horns etc., and it more especially consists of the features pointed out in the annexed claims.

The purpose of my invention is to provide a means of support for a non-resonant and non-absorbent composition that is self setting and is applied while in a plastic state to phonograph horns etc.; that simplifies the production of horns of this type; that, because of the fibrous nature of the support, becomes impregnated with the composition which when the latter has hardened will be practically homogeneous throughout; and that by reason of the structural features serves to hold the composition locked to the support so that the latter will not crack, even under very rough handling such as it will never be called on to withstand in ordinary usage.

With these and other ends in view, I illustrate in the accompanying drawing such instances of adaptation as will disclose the broad underlying features without limiting myself to the specific details shown thereon and described herein.

Figure 1 is a sectional elevation, lengthwise of a horn, showing the inner support for the composition horn body.

Fig. 2 is an enlarged section showing the support without composition, partially coated and completely covered.

In carrying my invention into practice, I may use any kind of a fibrous or porous sheet 1 and pass the same between rollers, not shown, one of which has pointed pins that project beyond the face and the other has grooves or depressions that register with the pins. As the sheet passes between the rollers the pins form conical holes 2 surrounded with a raised border or burr 3 on the opposite side of the sheet which terminates in a more or less ragged edge. The holes may, however, be formed of any shape and in any desired manner by means of a flat bed press or otherwise.

Having the perforate sheets, the next step is to shape them over any desired form, not shown, for instance, similar in shape to the horn shown in Fig. 1 or any other sound device. While so placed the composition 4 in a semi-plastic state is applied to the support on its outside in whatever thickness is desired. In the case of the reproducing horn shown, it is applied in a gradually increasing thickness toward the small end of the horn; while in the case of a recording horn (not shown) the greatest thickness is at the large (receiving) end, being approximately proportional to the energy of the passing sound waves per unit area. The latter is described in my Patent #1,358,883 of November 16, 1920.

The composition runs into the openings 2 at the small end but according to its plasticity may not completely fill the large end of the openings, in which case, after the support not shown is removed from its form these unfilled openings are filled with the composition as at 5, thus completely locking the composition to the support. If desired, a thin inner coating may be brushed onto the inner side of the support and in addition the whole may be covered inside and out with a coating of varnish of any desired kind. With this construction the inside of the sound device is left in a smooth condition to faithfully assist in transmitting sound vibrations.

Paradoxically a horn of this type may be said to be non-vibrant within practical requirements and at the same time very vibrant. This apparent contradiction may be explained by stating that a horn formed of a non-absorbent and non-responsive composition will not subtract from or add to the passing sound waves. On the other hand, being "very vibratory" it permits the full delivery of the vibrations without modification, retardation, or acceleration, thus being fully vibrant in its characteristic of non-interference. In the present connection, both terms "non-vibrant" and "very vibrant" may be used synonymously within the limitations set forth.

By the use of the means shown and described, or any equivalent thereof, the production of horns of this type is facilitated and the cost is reduced materially while at the same time the tone quality of records etc., is maintained at its original value. It is understood that in the use of the expression "records etc." I do not limit myself to the specific sources of sound vibrations, as these may comprise mechanical, acoustical, electrical or any available equivalents.

In order that a maximum number of anchor points 5 in a given area, according to the purpose to which the composition is to be applied, may be secured, the perforations are arranged in the shape of equilateral triangles which admits of an increase in number of about 15% over an arrangement where they are placed in square formation. The openings may occur in larger or smaller number according to the exigencies of various practical demands.

What I claim is:

1. The process of producing sound conveying devices, consisting in forming a plurality of perforations in a fibrous sheet, in shaping the sheet to the desired form, in applying a plastic self-setting composition to the sheet, and in causing the composition to enter the perforations so as to effectively lock the composition and sheet to each other.

2. The process of producing sound conveying devices, which consists in forming a plurality of conical perforations in a fibrous sheet, in forming the desired sound conveying devices of the perforated sheet so that the smaller ends of the perforations are on its exterior, in applying a self-setting coating of semiplastic composition to such exterior and into the perforations to cover and impregnate the sound device, and in suitably seasoning the same to harden the composition.

3. A lining for sound conveying devices, comprising a fibrous texture having conical openings therethrough, and burrs formed adjacent the small end of the openings.

4. A sound conveying device, comprising a fibrous lining having conical openings therethrough, burrs formed adjacent the small end of the openings, and a self-setting composition applied to the burr or outside of the lining and also to the conical side of the openings to form an anchorage for the composition.

5. The process of producing sound conveying devices, which consists in shaping a fibrous sheet into the desired form of the sound conveying device, said sheet having a plurality of conical perforations formed therein with the small ends of the perforations on the exterior surface of the sound device, in applying a semiplastic non-resonant and non-absorptive self-setting composition to such surface and in openings thereof.

6. An article of manufacture, comprising a flexible fibrous sheet having a plurality of conical perforations formed therethrough, said sheet being adapted to receive and hold a semiplastic self-setting composition placed thereon over the small ends of the perforations and into the same after said sheet is formed into any desired shape.

7. An article of manufacture, comprising a formed sheet of fibrous material having a plurality of conical openings therethrough the small ends of the openings terminating on the exterior of the article, and a semiplastic self-hardening composition applied to the exterior of the article and into the openings thereof.

8. A sound conveying device, consisting of a tubular shaped member formed of a fibrous sheet having a plurality of perforations approximating a conical shape therethrough, and a semi-plastic self-setting composition applied to the exterior of the member and into the perforations thereof.

9. A sound conveying device, consisting of a tubular member formed of a porous sheet having a plurality of conical perforations formed therethrough with the large ends of the openings on the interior of the member, and a semi-plastic self-setting composition applied as a thick layer on the exterior of the member and a relatively thin coating of the composition on the interior of the member the composition also filling the perforations.

10. A sound conveying device, consisting of a tubular member formed of a porous sheet having a plurality of conical perforations formed therethrough with the large ends of the openings on the interior of the member, a semi-plastic self-setting composition applied in the perforations and in a variable thickness on the exterior proportional to the variable intensity of sound waves that said member is designed to convey.

In testimony whereof I affix my signature.

BAGSTER ROADS SEABROOK.